United States Patent
Akbarian

(10) Patent No.: US 10,956,352 B2
(45) Date of Patent: Mar. 23, 2021

(54) AUTOMATIC LOCATION BASED ADDRESSING METHOD FOR NETWORK PARTICIPANTS IN A SERIAL BUS SYSTEM

(71) Applicant: Continental Automotive Systems, Inc., Auburn Hills, MI (US)

(72) Inventor: Hesam Akbarian, Chatham (CA)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 15/991,732

(22) Filed: May 29, 2018

(65) Prior Publication Data

US 2019/0370206 A1    Dec. 5, 2019

(51) Int. Cl.
*G06F 13/40* (2006.01)
*H04L 12/40* (2006.01)

(52) U.S. Cl.
CPC .......... *G06F 13/4063* (2013.01); *H04L 12/40* (2013.01); *H04L 2012/40234* (2013.01)

(58) Field of Classification Search
None
See application file for complete search history.

(56) References Cited

U.S. PATENT DOCUMENTS

| | | | |
|---|---|---|---|
| 5,329,480 A * | 7/1994 | Wu .......................... | G11C 11/14 257/421 |
| 6,188,268 B1 | 2/2001 | Nayebi et al. | |
| 7,069,115 B1 * | 6/2006 | Woytowitz ............. | A01G 25/16 137/78.3 |
| 9,176,914 B2 * | 11/2015 | Han ....................... | H04L 12/403 |
| 2005/0132109 A1 | 6/2005 | Steger | |
| 2005/0157479 A1 * | 7/2005 | Hayden ............... | G06F 13/4081 361/788 |
| 2010/0100200 A1 * | 4/2010 | Kim ..................... | G06F 13/4022 700/12 |

(Continued)

FOREIGN PATENT DOCUMENTS

| | | |
|---|---|---|
| DE | 10256631 A1 | 7/2004 |
| EP | 1603282 A1 | 12/2005 |

(Continued)

OTHER PUBLICATIONS

Roger D. Secura, "Use a Transistor as a Switch", Nuts and Volts, May 2015, pp. 45-47 (Year: 2015).*

(Continued)

*Primary Examiner* — Hyun Nam

(57) ABSTRACT

A method for detecting and identifying modules of a bus system is provided. The bus system includes a control unit, a bus starting from the control unit, and a plurality of modules connected to the bus. The method includes providing a current sink associated with each of the one or more modules. The current sink includes a transistor. The method includes providing a hall sensor associated with each of the one or more modules. The hall sensor detects a current on a low-side data line of the bus. For each one of the one or more modules: when the hall sensor detects a current on the low-side data line, the method includes maintaining a closed position of the transistor; and when the hall sensor fails to detect a current on the low-side data line, the method includes opening the transistor such that current does not flow to the module.

12 Claims, 3 Drawing Sheets

(56) References Cited

U.S. PATENT DOCUMENTS

| | | |
|---|---|---|
| 2011/0140533 A1 | 6/2011 | Zeng et al. |
| 2013/0154603 A1* | 6/2013 | Cerutti ...................... H02J 3/02 |
| | | 323/312 |
| 2013/0311691 A1* | 11/2013 | Barrenscheen ....... H04L 12/403 |
| | | 710/110 |
| 2014/0095749 A1 | 4/2014 | Lambrechts |
| 2015/0019884 A1* | 1/2015 | Huff ....................... H04L 12/10 |
| | | 713/300 |
| 2015/0108953 A1 | 4/2015 | Kobayashi et al. |
| 2017/0242816 A1 | 8/2017 | Elend et al. |

FOREIGN PATENT DOCUMENTS

| | | |
|---|---|---|
| EP | 2408053 A2 | 1/2012 |
| EP | 3209001 A1 | 8/2017 |
| WO | 2017205096 A1 | 11/2017 |

OTHER PUBLICATIONS

"Simplified Description of USB Device Enumeration", FTDI Chip, Oct. 28, 2009 (Year: 2009).*
Ben King, Hall-effect Sensor Overview, Sep. 2019, Texas Instruments (Year: 2019).*
Combined Search and Examination Report dated Nov. 8, 2019 from corresponding GB application No. GB 1907014.3.

* cited by examiner

AUTOMATIC LOCATION BASED ADDRESSING METHOD FOR NETWORK PARTICIPANTS IN A SERIAL BUS SYSTEM

TECHNICAL FIELD

This disclosure relates to a method of automatic location based addressing for network participants in a serial bus system. In addition, the disclosure relates to identifying one or more modules on the shared serial bus system, for example, a vehicle LIN bus system.

BACKGROUND

A vehicle communication network is a dedicated internal bus network that interconnects modules inside a vehicle. Each module is a node on the communication network and controls specific components related to its function and communicates with other modules as necessary, using a standard protocol, over the communication network such as LIN. A vehicle communication protocol is a system of rules that allow the modules of the vehicle to transmit information via the vehicle bus and use a common shared physical bus wire. As such, the protocol defines the rules syntax, semantics, and synchronization of communication and possible error recovery methods. The vehicle protocols depend on the vehicle manufacture. The vehicle protocols, include, but are not limited to, CAN (controller area network) which is an inexpensive low-speed serial bus for interconnecting automotive components and modules, and LIN (local interconnect network) which is a very low cost in-vehicle sub-network.

Generally, during the manufacturing process, various modules are placed in a vehicle, communicating on a single bus. In this configuration, first, a programming tool programs the electronic control unit (ECU) with participants ID numbers that is connected to the various modules so that the ECU understands messages associated with each one of the various modules. Following, a second programming tool programs each module with its own ID which is stored in the ECU. Then, a third testing tool tests the communication bus to verify that all the modules are connected to the electronic communication unit.

The modules connected to the bus are assigned a specific identifier during the manufacturing process. Therefore, each module cannot be relocated or used in a position different from its original position. For example, if a vehicle system includes four modules each assigned a specific task, then if one of the modules needs to be replaced or repositioned, the entire system should be reprogrammed and reconfigured. Previous systems provide complicated circuits that detect a current on a high-side current source leading to the identification of the replaced or repositioned module. Therefore, to locate a module, either a series of sequential electrical connection in the assembly line is required to detect the modules sequentially, or a high-side current source is used to inject a current to the network that includes the modules. The latest or end module is detected for the fact that there would be no current flowing to its bus shunt resistance. In this method, additional resistance is added to the bus, which interferes with the physical layer of the bus.

Therefore, there is a need to improve the identification of modules within a vehicle system connected to each other by way of a vehicle bus by reducing the time and the tools used. In addition, there is a need to have a plug-and-play vehicle system where the position of the modules is readily determined.

SUMMARY

One aspect of the disclosure provides a method for detecting and identifying modules of a bus system. The bus system includes a control unit, a bus starting from the control unit, and a plurality of modules connected to the bus. The method includes providing a current sink associated with each of the one or more modules. The current sink includes a transistor. The method includes providing a hall sensor associated with each of the one or more modules. The hall sensor detects a current on a low-side data line of the bus. For each one of the one or more modules: when the hall sensor detects a current on the low-side data line, the method includes maintaining a closed position of the transistor; and when the hall sensor fails to detect a current on the low-side data line, the method includes opening the transistor such that current does not flow to the module.

Implementations of this aspect of the disclosure may include one or more of the following optional features. In some implementations, the method further includes, when the hall sensor fails to detect the current on the low-side data line, the module associated with the hall sensor assigns itself an identifier.

In some implementations, the method further includes, when the hall sensor fails to detect the current on the low-side data line, the module communicates its assigned identifier with the other modules in the network. The identifier associated with the module is different from identifiers associated with other modules.

In some examples, when the hall sensor fails to detect a current on the low-side data line, the module associated with the hall sensor determines that the module is a last module positioned on the bus. In some implementations, the method includes applying a source current or voltage switch associated with the control unit in the bus. The source current or voltage switch includes a high side transistor.

In some implementations, the current sink includes a resistor. The transistor includes a collector terminal connected to the resistor and an emitter terminal connected to ground. The resistor is connected to the low-side data line.

Another aspect of the disclosure provides a system for detecting an end module from a group of modules connected to one another and to an electronic control unit in series by way of a communication bus having a low-side data line. The system includes a current sink associated with each of the one or more modules. The current sink includes a transistor. The system includes a hall sensor associated with each of the one or more modules. The hall sensor detects a current on a low-side data line of the communication bus. For each module: when the hall sensor detects a current on the low-side data line, the transistor maintains a closed position; and when the hall sensor fails to detect a current on the low-side data line, the transistor opens such that current does not flow to the module.

Implementations of this aspect of the disclosure may include one or more of the following optional features. In some implementations, when the hall sensor fails to detect a current on the low-side data line, the module associated with the hall sensor assigns itself an identifier. In some examples, when the hall sensor fails to detect a current on the low-side data line, the module communicates its assigned identifier with the other modules in the network.

The identifier associated with the module is different from identifiers associated with other modules.

In some implementations, when the hall sensor fails to detect a current on the low-side data line, the module associated with the hall sensor determines that the module is a last module positioned on the communication bus. In some examples, the system includes a current source or voltage switch associated with the control unit and applying a current to the bus, the current source or voltage switch include a high side transistor. The current sink may further include a resistor. The transistor has a collector terminal connected to the resistor and an emitter terminal connected to ground. The resistor is connected to the low-side data line.

The details of one or more implementations of the disclosure are set forth in the accompanying drawings and the description below. Other aspects, features, and advantages will be apparent and concluded from the description and drawings, and from the claims.

DESCRIPTION OF DRAWINGS

Like reference symbols in the various drawings indicate like elements.

DETAILED DESCRIPTION

Figure 1:
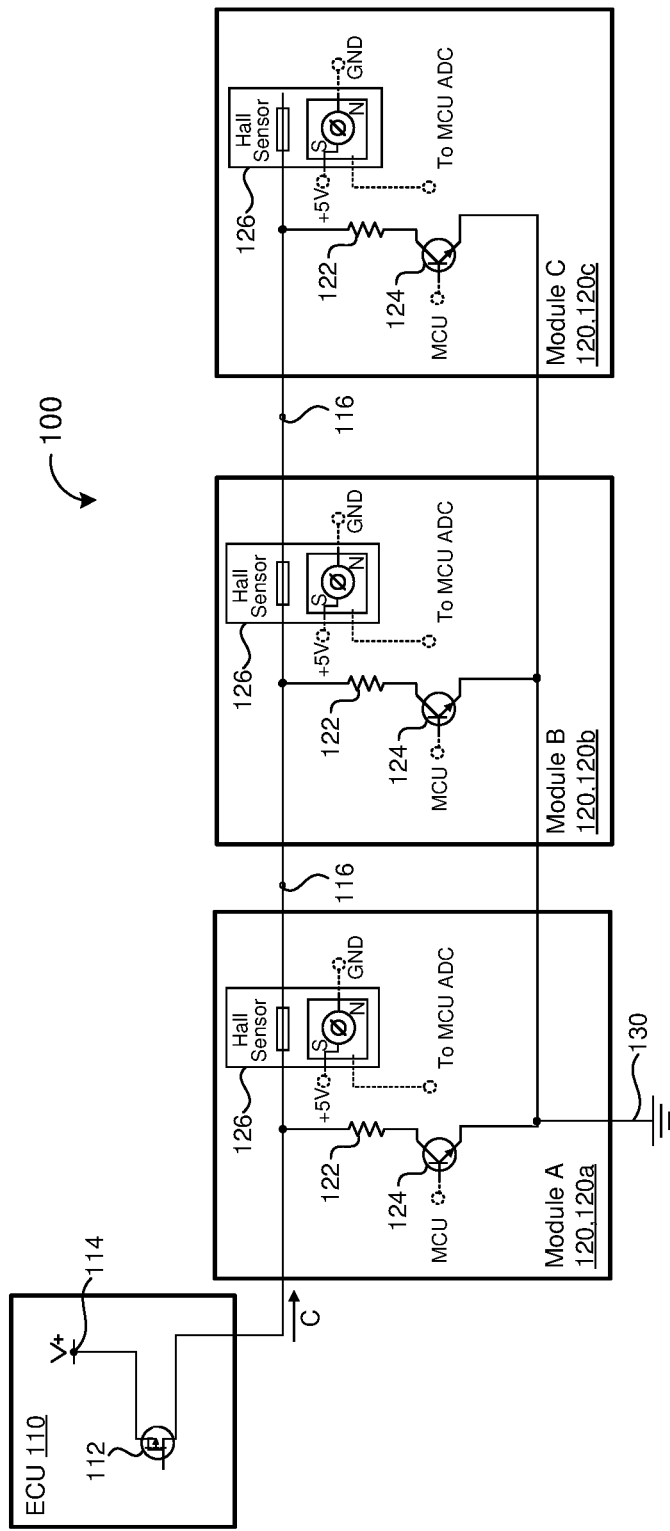
FIG. 1 is a schematic view of an exemplary vehicle communication system including an electronic control unit and modules.

Referring to FIG. 1, a vehicle communication system 100 includes a control unit 110 (master) to which the bus 116 is connected. The communication system 100 includes one or more modules 120 (slaves) connected to the bus 116. The control unit 110 and the modules 120 are connected in series along the bus 116. The control unit 110 and the modules 120 are connected to a ground potential 130. The control unit 110 may be an engine control unit (ECU) or an engine control module (ECM), which is a type of electronic unit that controls a series of actuators on an internal combustion engine to ensure optimal engine performance. The control unit 110 includes a transistor 112 having a first end connected to a voltage source 114. The voltage source 114 maintains a fixed voltage independent of the load resistance or the output current. The transistor 112 may be a field-effect transistor (FET) that uses an electric field to control the electrical behavior of the device. In some examples, the transistor 112 is a MOSFET (metal-oxide-semiconductor field-effect transistor) which is a type of FET that includes an insulated gate, whose voltage determines the conductivity of the device. The transistor 112 may be a P-channel MOSFET.

The vehicle communication system 100 includes one or more modules 120, 120a-c. As shown, the vehicle communication system 100 includes three modules, 120, 120a, 120b, 120c. However, the vehicle communication system 100 may include more or less modules 120. The modules 120, 120a-c are connected in series with one another and with the ECU 110. The modules 120 may be any vehicle module, such as, but not limited to EWP (electric water pump). Each module 120, 120a-c includes a current sink that includes a resistor 122 and a transistor 124 (BJT or MOS-FET). The transistor 124 includes a collector terminal connected to the resistor 122, an emitter terminal connected to ground 130 and a base connected to an MCU Micro-Controller Unit) (not shown). The MCU controls the transistor 124 based on sensor information received from a hall sensor 126 (discussed below).

The vehicle communication system 100 detects the latest or end module 120c connected in the series by way of detecting a current C from the voltage source 114 passing through a main contact point being the contact point between the current C and the module 120. Each module 120 includes a magnetic sensor 126 that detects the current C flowing from the voltage source 114 to the modules 120, 120a-c at the contact point on the low-side data line of the bus 116. Because of the configuration of the system 100, when all the modules 120, 120a-c are pulled down through the transistor 124, only the last module 120, 120a-c does not draw current C on the right side of the bus 116. Once the vehicle communication system 100 detects the latest or end module 120a-c, then the latest or end module 120a-c assigns an identifier (ID) to itself and later propagates its assigned ID to all the module 120a-c so that in the next round none of the other module 120a-c pick the same ID. Then the latest module 120a-c leaves the vehicle communication system 100 allowing the other modules 120a-c to be detected sequentially, from the furthest module 120a-c connected to the ECU 110 to the closest module 120a-c connected to the ECU 110. The hall sensor 126 detects the current C by detecting the presence of a magnetic field which results in a true and false output, i.e., a digital output. The hall sensor 126 includes a first terminal connected to ground 130, a second terminal connected to a voltage source (e.g., 5 volts), and a third terminal connected to MCU (not shown). Upon detection of the current C, the hall sensor 126 sends a signal (i.e., digital signal) to the MCU (not shown). The MCU then controls the transistor 124 by opening the transistor 124 and preventing the current C from flowing to the module 120, 120a-c. As such, the module 120, 120a-c determines that it is the last module 120, 120a-c and assigns itself an identifier (ID). The identifier may be numerical, alphanumerical, or a combination thereof. Once the last module 120, 120a-c assigns itself an identifier, then another module 120, 120a-c identifies itself. The MCU of the last module 120, 120a-c communicates with the MCU of other modules and/or the ECU 110 indicating the identifier that the module 120, 120a-c assigned itself. As such, other modules 120a, 120a-c do not use the same identifier.

The vehicle communication system 100 shown in FIG. 1 includes three modules 120, a first module 120a, a second module 120b, and a third module 120c. Therefore, the hall sensor 126 of the third module fails to detect the current C since the circuit is open and sends a message to the MCU informing the MCU that the hall sensor 126 of the third module 120c did not detect the current C. Then the MCU switches the transistor 124 of the third module 120c to an open position preventing the current C to flow through the transistor 124. In addition, the MCU instructs the third module 120c to assign itself an identifier. Once the transistor 124 of the third module 120c is open, then the hall sensor 126 of the second module 120b fails to detect the current C since the circuit is open and sends a message to the MCU informing the MCU that the hall sensor 126 of the second module 120b did not detect the current C. Following, the MCU switches the transistor 124 of the second module 120b to an open position preventing the current C from flowing through the transistor 124 of the second module 120b. In addition, the MCU instructs the second module 120b to assign itself an identifier different from the identifier of the third module 120c. Once the transistor 124 of the second module 120b is open, then the hall sensor 126 of the first module 120a fails to detect the current C since the circuit is open and sends a message to the MCU informing the MCU that the hall sensor 126 of the first module 120a did not detect the current C. Then the MCU switches the transistor 124 of the first module 120a to an open position preventing the current C from flowing through the transistor 124 of the first module 120a. In addition, the MCU instructs the first module 120a to assign itself an identifier different from the identifier of the second module 120b and the third module 120c.

The system 100 eliminates the need for programming module identifiers (IDs) into each module 120, 120a-c through detection of a module 120, 120a-c placed in the vehicle. As such, the digital switching by the transistor 124 resulting from the hall sensor 126 detection of the non-zero current C or lack of the current C provides an improvement over the previous analogue detection systems in a sense of digital states of zero versus non-zero. In addition, the digital nature of the system 100 eliminates environmental noise such as temperature changes and increases robustness of the system 100. In this method, since the absolute value of the current C is not processed, the current injection and detection are not needed to be accurate and temperature independent, resulting in a simple implementation of the method with a few components. As opposed to prior systems, the discloses digital approach provides zero resistance on the low-side data line since the hall sensor 126 does not connect to the bus 116, instead the hall sensor 126 is positioned adjacent to the bus 116 and senses the current C flow within the bus 116.

Figure 2:
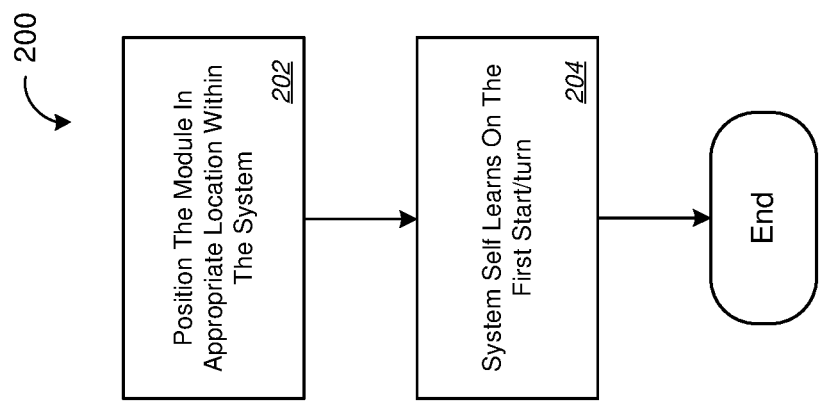
FIG. 2 is a schematic view of an exemplary arrangement of operations for assigning identifiers to modules in the vehicle communication system of FIG. 1.

FIG. 2 provides an example arrangement of operations for a method 200 of self-learning identifiers using the system 100 of FIG. 1. At block 202, the method 200 includes positioning one or more modules 120, 120a-c connected to one another and to an ECU 110 in series. Each one of the one or more modules 120, 120a-c teaches itself an identifier on the first start/run of the vehicle based on a detection or lack of detection of a current C on the low-side data line of the bus 116.

Figure 3:
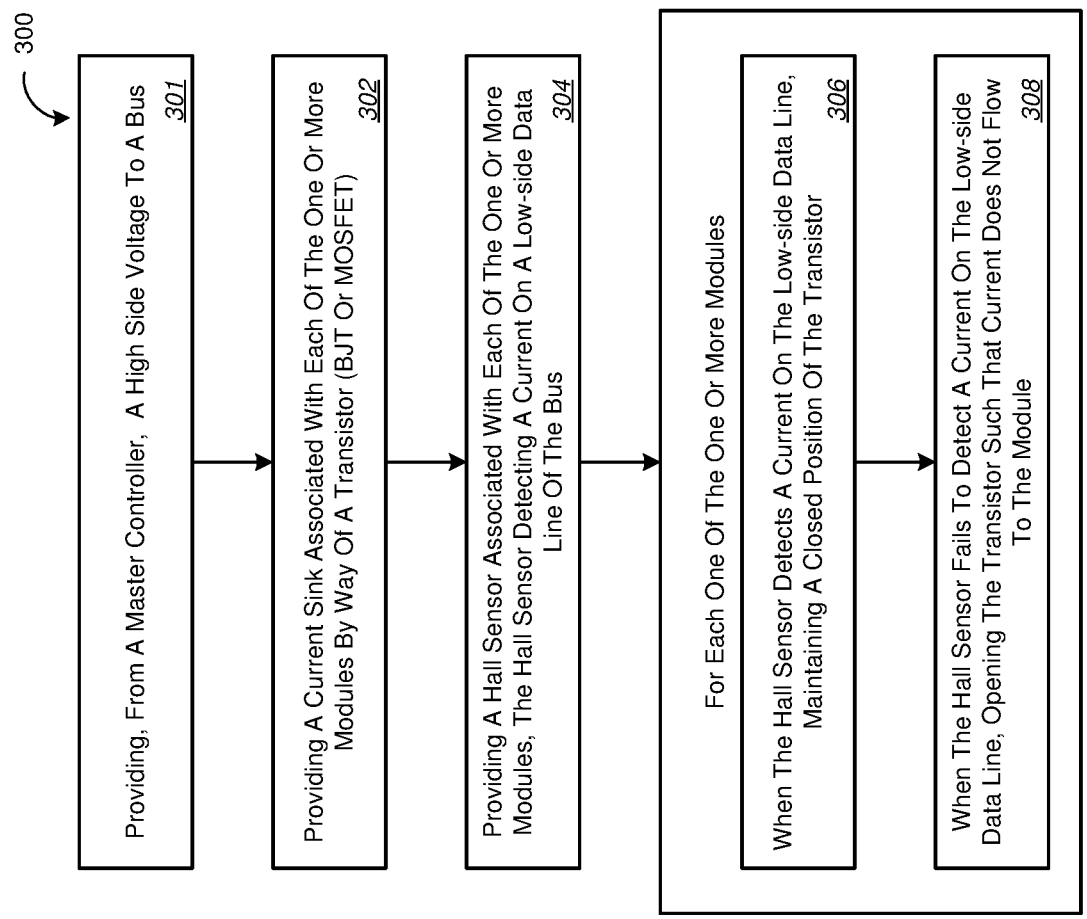
FIG. 3 is a schematic view of an exemplary arrangement of operations for assigning identifiers to modules in the vehicle communication system of FIG. 1.

FIG. 3 provides an example arrangement of operations for a method 300 of detecting and identifying modules 120, 120a-c of a bus system e.g., vehicle communication system 100 of FIG. 1. The bus system 100 includes a control unit 110, a bus 116 starting from the control unit 110, and a plurality of modules 120, 120a-c connected to the bus 116. At block 301, the method 300 includes providing from a controller unit 110 (master) a current source or voltage switch 114 associated with the control unit 110 in the bus 116. The source current or voltage switch 114 includes a high side transistor 112. At block 302, the method 300 includes providing a current sink associated with each of the one or more modules 120, 120a-c. The current sink includes a resistor 122 and a transistor 124. The transistor 124 has a collector terminal connected to the resistor 122 and an emitter terminal connected to ground 130. The transistor 124 also has a base terminal connected to the MCU. The resistor 122 is connected to the low-side data line of the bus 116. The method 300 also includes applying a high voltage at the low-side data line of the bus 116 for providing the current C.

At block 304, the method 300 includes providing a hall sensor 126 associated with each of the one or more modules 120, 120a-c. The hall sensor 126 detects a current C on the low-side data line of the bus 116.

At block 306, for each one of the one or more module 120, 120a-c, when the hall sensor 126 detects the current C on the low-side data line of the bus 116, the method 300 includes maintaining a closed position of the transistor 124. At block 308, for each one of the one or more module 120, 120a-c, when the hall sensor fails to detect the current C on the low-side data line of the bus 116, opening the transistor such that current does not flow to the module.

In some examples, when the hall sensor 126 fails to detect the current C on the low-side data line of the bus 116, the module 120, 120a-c associated with the hall sensor 126 assigns itself an identifier. In addition, when the hall sensor fails to detect a current on the low-side data line, the module communicates its assigned identifier with the other modules in the network. The identifier associated with each module 120, 120a-c is different from identifiers associated with other modules.

When the hall sensor 126 fails to detect the current C on the low-side data line of the bus 116, the module 120, 120a-c associated with the hall sensor 126 determines that the module 120, 120a-c is the last module positioned on the bus 116.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A method for automatically detecting and identifying modules of a bus system comprising a control unit, a bus starting from the control unit, and a plurality of modules connected to the bus, the method comprising:
providing a current sink electrically connected with each one of the plurality of modules, the current sink comprising a transistor;
providing a hall sensor electrically connected with each one of the plurality of modules, the hall sensor detecting a presence of current on the bus;
for each module of the plurality of modules:
when the hall sensor detects a current on the bus, maintaining a closed position of the transistor; and
when the hall sensor fails to detect a current on the bus, opening the transistor such that current does not flow to the module, the module automatically assigns itself an identifier, and the respective module communicates its assigned identifier with the other modules on the bus.

2. The method of claim 1, wherein when the hall sensor fails to detect the current on the bus, the identifier assigned by the respective module is different from identifiers of other modules of the plurality of modules.

3. The method of claim 1, further comprising, when the hall sensor fails to detect the current on the bus, the respective module determines that the respective module is a last module positioned on the bus.

4. The method of claim 1, further comprising applying a current source or voltage switch from the control unit to the bus, the current source or voltage switch comprising a high side transistor.

5. The method of claim 1, wherein the current sink further comprises a resistor, the transistor having a collector terminal connected to the resistor and an emitter terminal connected to ground.

6. A system for automatically detecting an end module from a group of modules connected to one another and to an electronic control unit in series by way of a communication bus, the system comprising:
   a current sink electrically connected with each module of the group of modules, the current sink comprising a transistor;
   a hall sensor electrically connected with each module of the group of modules, the hall sensor constructed and arranged to detect a presence of current on the communication bus;
   wherein for each module of the group of modules:
      when the hall sensor detects a current on the bus, the transistor is constructed and arranged to maintain a closed position; and
      when the hall sensor fails to detect a current on the bus, the transistor is constructed, arranged to open such that current does not flow to the module and the module automatically assigns itself an identifier, and the respective module communicates its assigned identifier with the other modules on the communication bus.

7. The system of claim 6, wherein the identifier assigned by the respective module is different from identifiers of other modules.

8. The system of claim 6, further comprising, when the hall sensor fails to detect a current on the bus, the respective module determines that the respective module is a last module positioned on the communication bus.

9. The system of claim 6, further comprising a current source or voltage switch within the electronic control unit and constructed and arranged to apply a current to the communication bus, the current source or voltage switch comprising a high side transistor.

10. The system of claim 6, wherein the current sink further comprises a resistor, the transistor having a collector terminal connected to the resistor and an emitter terminal connected to ground.

11. The method of claim 1, wherein the hall sensor detects the current by detecting a presence or a lack of presence of a magnetic field and outputs a digital signal indicating that the magnetic field is present or is not present.

12. The system of claim 6, wherein the hall sensor is constructed and arranged to detect the current by detecting a presence or a lack of presence of a magnetic field and to output a digital signal indicating that the magnetic field is present or is not present.

* * * * *